United States Patent [19]

Rutz et al.

[11] 4,056,080
[45] Nov. 1, 1977

[54] RECIPROCATING INTERNAL COMBUSTION ENGINE

[75] Inventors: Peter Rutz, Winterthur; Anton Steiger, Illnau, both of Switzerland

[73] Assignee: Sulzer Brothers Limited, Winterthur, Switzerland

[21] Appl. No.: 718,086

[22] Filed: Aug. 26, 1976

[30] Foreign Application Priority Data

Mar. 5, 1976 Switzerland ............... 2753/76

[51] Int. Cl.² .............. F02B 45/02; F02B 19/04; F02F 3/28
[52] U.S. Cl. .............. 123/23; 123/30 C; 123/193 P
[58] Field of Search ......... 123/23, 24, 30 C, 136, 123/193 P; 60/39.46 S

[56] References Cited

U.S. PATENT DOCUMENTS

| 1,216,403 | 2/1917 | Bertsch | 123/23 |
| 1,583,669 | 5/1926 | Davol | 123/30 C |
| 2,534,346 | 12/1950 | Fenney | 123/30 C |

FOREIGN PATENT DOCUMENTS

| 123,727 | 7/1931 | Austria | 123/23 |
| 117,309 | 9/1946 | Sweden | 123/32 C |
| 547,256 | 8/1942 | United Kingdom | 123/23 |
| 522,104 | 6/1940 | United Kingdom | 123/23 |
| 450,727 | 7/1936 | United Kingdom | 123/23 |

*Primary Examiner*—Carroll B. Dority, Jr.
*Assistant Examiner*—Craig R. Feinberg
*Attorney, Agent, or Firm*—Kenyon & Kenyon, Reilly, Carr & Chapin

[57] ABSTRACT

Powdered fuel charges are injected mechanically into a pocket in the piston during a first half of a compression stroke for subsequent expulsion into the combustion chamber during the second half of the compression stroke. The dosing and ejecting means is mounted in the cylinder wall and includes a plunger which ejects the fuel charges from a duct. Movement of the plunger in the duct is cyclically blocked by a slider during filling of the duct with a fuel charge.

14 Claims, 8 Drawing Figures

RECIPROCATING INTERNAL COMBUSTION ENGINE

This invention relates to a reciprocating internal combustion engine and particularly, a reciprocating internal combustion engine fueled with powdered fuel.

Internal combustion engines in which powdered coal is burned as the fuel have been known for some time. In one known engine, a mixture formed from powdered coal and air is fed via two coaxially arranged valves to an antechamber, in which the mixture is then ignited with the aid of oil and then burned. However, it has been difficult to obtain a uniform charge of the combustion chamber with fuel in these engines since a homogeneous distribution of the powdered coal in the air cannot be achieved. As a result, the known engine has usually had a different charge and for each working cycle during operation and, thus, a varying power output. Further, it has been difficult to feed-in a definite amount of powdered coal per working cycle as a function of the demanded power.

Accordingly, it is an object of the invention to improve the cyclic feeding of fuel to the cylinders of a reciprocating internal combustion engine.

It is another object of the invention to introduce a precisely controlled amount of powdered fuel into a combustion chamber of a reciprocating internal combustion engine for each cycle of the engine.

It is another object of the invention to obtain a constant power output from a reciprocating internal combustion engine fueled with powdered fuel.

It is another object of the invention to obtain a uniform distribution of fuel in a combustion chamber prior to injection and to ignite the fuel at a precise time.

Briefly, the invention provides an internal combustion engine having at least one cylinder and a piston slidably mounted in the cylinder with a mechanical fuel dosing and ejecting means for ejecting powdered fuel, such as powdered coal, cyclically and tangentially into a pocket in the piston. The pocket is centrally disposed in a surface of the piston facing a combustion chamber defined by a wall of the cylinder and includes an undercut portion in the peripheral surface. In addition, the pocket is defined by a surface of revolution so as to be symmetrical. The dosing and ejecting means and piston are arranged so that the fuel is ejected into the pocket in the form of a jet for initial collection under the undercut during a first half of a compression stroke of the piston in the cylinder and for subsequent release into the combustion chamber during a second half of the compression stroke under the influence of decreasing centrifugal force and increasing axial deceleration of the piston.

The piston and cylinder may be cooled in any suitable known fashion and the cylinder may also be provided with suitable bores for a flushing medium.

The mechanically operating dosing and ejecting means requires no air as the carrier or transport medium for the powdered coal. Further, the fuel is distributed largely in a uniform manner by the pocket. Thus, inhomogeneous mixing cannot occur in the engine.

The capturing of the fuel is accomplished, for one, by the centrifugal force which is generated due to the tangential entry of the fuel jet into the rotation-symmetrical pocket and acts on the powder particles, and secondly by the acceleration of the upwardly moving piston that occurs in the first half of the compression stroke. As the pistons of the engine and likewise the cylinders are cooled in a relatively intensive manner, for instance with water, premature ignition of the fuel captured in the pocket is avoided.

The fuel is released from the pocket in a time interval during the second half of the compression stroke. In this second half, the piston executes a decelerated axial motion, so that the fuel escapes from the pocket into the combustion chamber due to the decrease of the centrifugal forces because of the friction and due to inertia. This escape is aided by the shape of the undercut of the pocket which is advantageously formed with a conical surface to guide the fuel into the combustion chamber.

The bounding of the pocket by a surface of revolution which is coaxial with the axis of the reciprocating engine ensures that the distribution of the fuel in the combustion chamber takes place largely in a rotation-symmetric manner and, therefore, uniformly. The escape of the fuel from the pocket can be improved by use of a central air injection means in a cylinder head opposite the piston through which compressed air is centrally blown into the pocket. Similarly, an ignition means can be provided to initiate combustion of the fuel in the combustion chamber. Such an ignition means may consist, for instance, of injecting ignition oil into the combustion chamber or of arranging an incandescent plug or spark plug in the combustion chamber.

When the engine is equipped with bores for a flushing medium, it is advantageous if a control means is used to release the ejection means only if the flushing bores are covered up, at least partially, by the upward-moving piston. In this way, blowing-away of the fuel by the flushing medium flow is avoided.

In one embodiment of the engine, the dosing and ejecting means includes a fuel receiving duct, a plunger in the duct and a pressure means for moving the plunger through the duct to eject the fuel into the piston pocket. During the working stroke, the plunger penetrates the duct completely up to the opening into the combustion chamber for injecting the fuel into the combustion chamber. This allows the plunger to clean the duct.

The pressure means which controls the plunger may have a double action. This allows the plunger to be controlled asymmetrically in such a manner that the working stroke takes place fast while the return stroke occurs slowly. For this purpose, a throttle element is provided in the pressure medium discharge on one side of the plunger control. The amount of fuel to be injected per cycle as a function of power can be controlled by varying the stroke of the plunger. Also, in order to control dosing and ejection of the fuel into the combustion chamber in the proper sequence, use is made of a control slider which is secured against rotation and controlled by a pressure medium. The slider is movable between a first position blocking the plunger while connecting the duct to a fuel accumulator to be filled with fuel and a second position blocking the accumulator while permitting movement of the plunger during the working stroke. For this control to occur at the correct time, it is advantageous if the movements of the plunger and the control slider are synchronized with the crankshaft of the engine. In addition, the plunger can pass through the control slider during the working stroke.

An advantageous embodiment for the feeding of the fuel can be realized if the accumulator is supplied with fuel by a fuel-feeding means which operates continuously against the pressure in the accumulator. Such a feeding device can be associated with one, several or all cylinders of the engine and may consist, for instance, of a conveyor screw. In addition, the ducts and passages carrying the fuel can be gradually enlarged in the flow direction of the fuel in order to avoid compaction of the fuel and a clogging of the ducts and passages due to the formation of plugs.

These and other objects and advantages of the invention will become more apparent from the following detailed description and appended claims taken in conjunction with the accompanying drawings in which:

Figure 1:
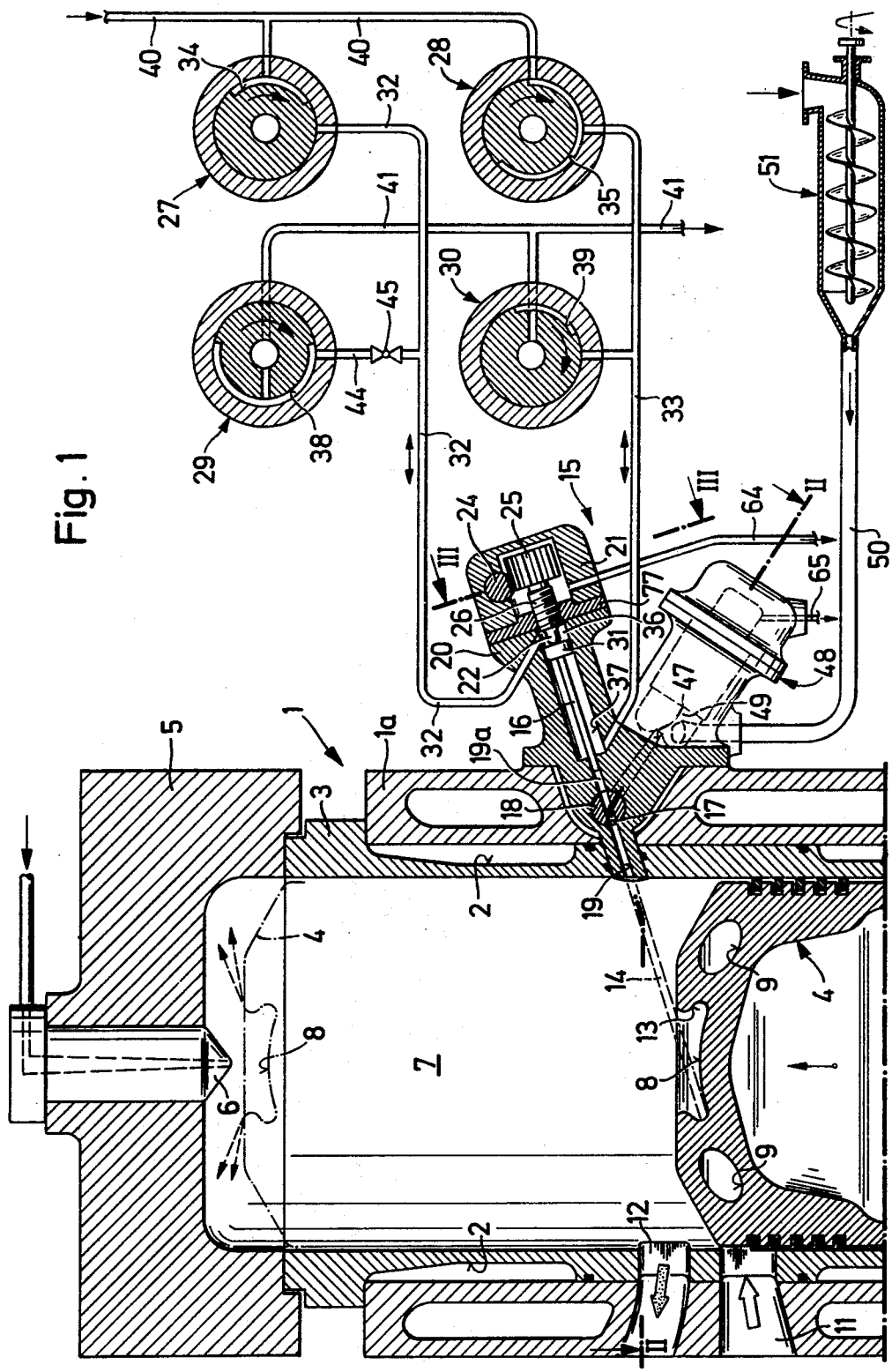
FIG. 1 illustrates an axial longitudinal cross-sectional view through a cylinder and a piston of an internal-combustion engine constructed in accordance with the invention.

Referring to FIG. 1, the reciprocating internal combustion engine has at least one cylinder 1 in which cooling chambers 2 are formed between a cylinder insert 3 and a cylinder jacket 1a. The insert 3 forms a combustion chamber 7 in which a piston 4 is slidably mounted for reciprocating motion. The position 4 also has cooling chambers 9 through which a coolant flows. The cylinder 1 supports a cylinder head 5, via the insert 3, which has either a centrally arranged air-blowing nozzle or a fuel injecting nozzle 6. Accordingly, a fuel oil can be injected through the nozzle 6, for instance, as an ignition aid. In this case, the nozzle 6 is equipped with openings which distribute the oil predominantly in a radial direction in the combustion chamber 7. However, instead of radial openings, the nozzle can also have axial exit openings which are directed toward a pocket 8 of the piston 4. The nozzle 6 is then fed with compressed air and aids in the complete explosion of fuel, such as powdered coal, which is captured in the pocket.

The pocket 8 is centrally arranged in the upper surface of the piston 4, as viewed, and is bounded by a surface of revolution which is generated by the rotation of an S-shaped curve section at a distance from the central axis of symmetry of the piston 4 or the cylinder 1. In this manner an annular undercut 13 is formed in the pocket 8 to temporarily receive the injected fuel.

Figure 2:
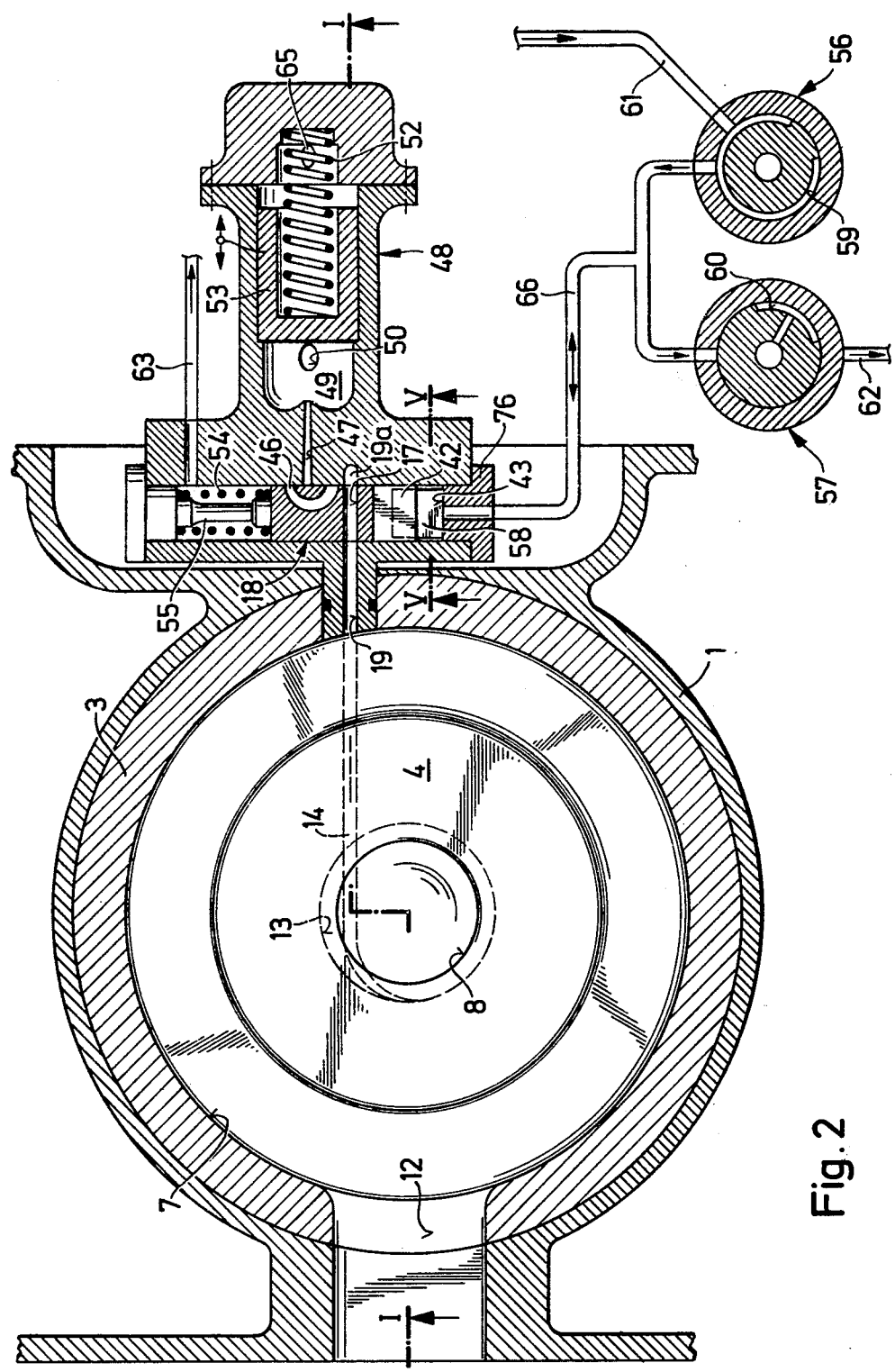
FIG. 2 illustrates a view taken on line II—II of FIG. 1.

In order to inject fuel into the pocket 8, a dosing and ejecting means 15 is mounted in the side wall of the cylinder 1 and passes through the insert 3. As shown in FIG. 2, the dosing and ejecting means 15 is arranged to eject the fuel cyclically and tangentially into the pocket 8 in the form of a fuel jet 14.

The dosing and ejecting means 15 consists of a plunger 16, which has double-control action and is driven by a pressure medium and which moves in a fuel feeding duct 19 located within a housing 20. The housing 20 is closed at one end by a cover 21 in any suitable manner. The stroke of the plunger 16 extends so far that the free end passes completely through the duct 19, although injecting the fuel requires only a stroke which corresponds to the part 19a of the duct 19 which is filled with fuel. The additional stroke of the plunger 16 serves to clean the duct 19.

Figure 3:
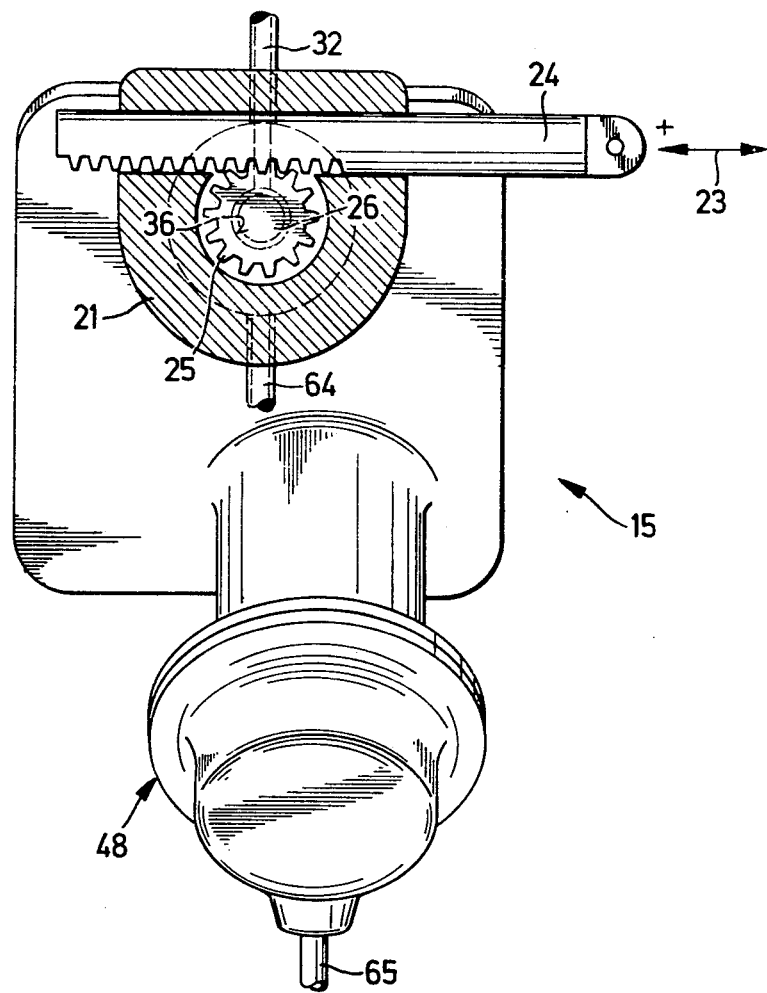
FIG. 3 illustrates a view taken on line III—III of FIG. 1.

In order to control the amount of fuel as a function of the load, the plunger 16 is adjustably mounted in the duct 19. To this end, a stop 22 is threaded via a screw thread 26 into an intermediate piece 77 which has a threaded bore and is located between the housing 20 of the plunger 16 and the housing cover 21. In addition, a rack 24 is mounted to pass into the housing cover 21 and to move under the influence of a power-dependent signal 23 (FIG. 3). The rack 24 meshes with a toothed pinion 25 on the stop 22 so as to rotate the stop 22 during movement into or out of the housing cover 21. In this way, the return stroke of the piston 16 can be limited and varied so as to control the amount of fuel as a function of power.

The pressure means for moving the plunger 16 is in the form of a hydraulic system and includes a plurality of rotary sliders 27 – 30 which control a flow of pressure medium via lines 32, 33 to the housing 20. In addition, the plunger 16 has a servo piston 31 at one end which is mounted between two enlarged chambers 36, 37 of the housing 20. The rotary sliders 27 – 30 are provided with control slots 34, 35, 38, 39 respectively and are rigidly connected to each other on a common shaft to rotate synchronously with the crank shaft (not shown) but are shown in the drawing separated for purposes of clarity. The sliders 27 – 30 control the inflow and outflow of the pressure medium to and from the chambers 36 and 37 by establishing a flow connection between the lines 32, 33 and a pressure line 40 or a discharge line 41, respectively.

In order to obtain a fast working stroke and a delayed slower return stroke of the plunger 16, a throttle 45 with a fixed preset choke orifice is provided in the line 44 which leads to the rotary slider 38 and branches off from the line 32.

Referring to FIGS. 1 and 2, a fuel accumulator 48 is secured to the dosing and ejecting means 15 in order to supply fuel to the duct 19. In addition, a control slider 18 is mounted in the duct 19 and has a passage 17 extending therethrough. The control slider 18 is movable between two positions. In one position, the slider 18 blocks the plunger 16 from moving through the duct 19 while connecting the duct to the accumulator 48. In the other position (FIG. 1), the slider 18 blocks the accumulator 48 while permitting movement of the plunger 16 in the duct 19 during a working stroke.

Figure 5:
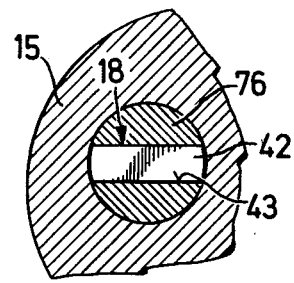
FIG. 5 illustrates a view taken on line V—V of FIG. 2.

Referring to FIG. 2, filling of the duct section 19a with fuel is controlled by the control slider 18, which is secured against rotation by a knife edge 42 engaging with a corresponding recess 43 of a closing piece 76 (FIG. 5) in which a pressure chamber 58 is formed at the underside. In addition, a semicircular passage 46 is formed in the slider 18 via which, with the slider 18 in the appropriate position, the duct section 19a of the fuel feeding duct 19 is connected with a passage 47 in the accumulator 48. This passage 47 starts at a pressure chamber 49 of the accumulator 48, has an increasing flow cross-section in the direction away from chamber 49 and serves to pass fuel out of the accumulator 48. Powdered fuel is continuously fed to a chamber 49 in the accumulator 48 via a fuel transporting duct 50 of a continuously operating fuel feeding means, e.g. a screw conveyor 51 (FIG. 1). This duct 50 has an increasing flow cross-section in the direction of the chamber 49. The fuel fed to the chamber 49 is placed under the pressure of a piston 53 which is loaded by a spring 52.

In order to execute the control movement, the slider 18 is equipped with a single-acting pressure medium control which works against a spring 54. The displacement of the control slider 18 by the pressure medium into the position which permits the working stroke of the plunger 16 is additionally limited exactly by a stop 55. This is to ensure an exact fit of the passage 17 in the fuel feeding duct 19.

The pressure medium control of the slider 18 is likewise accomplished via rotary sliders 56, 57 which are arranged rigidly on a common shaft and are synchronized with the crankshaft. The rotary sliders 56, 57 connect the pressure medium chamber 58 on the control side of the slider 18 via a line 66 and their control slots 59, 60, respectively, to a pressure line 61 and a discharge line 62, respectively. These lines 61, 62 are part of the hydraulic system mentioned above in connection with the plunger control. Suitable lines 63, 64, 65 are also provided for leakage of the pressure medium or powdered coal or for venting.

Referring to FIG. 1, the cylinder 1 is also provided with bores 11, 12 which connect with a supply line and discharge line for a flushing medium, e.g. air, which is used to empty the combustion chamber 7 after combustion takes place.

Figure 4:
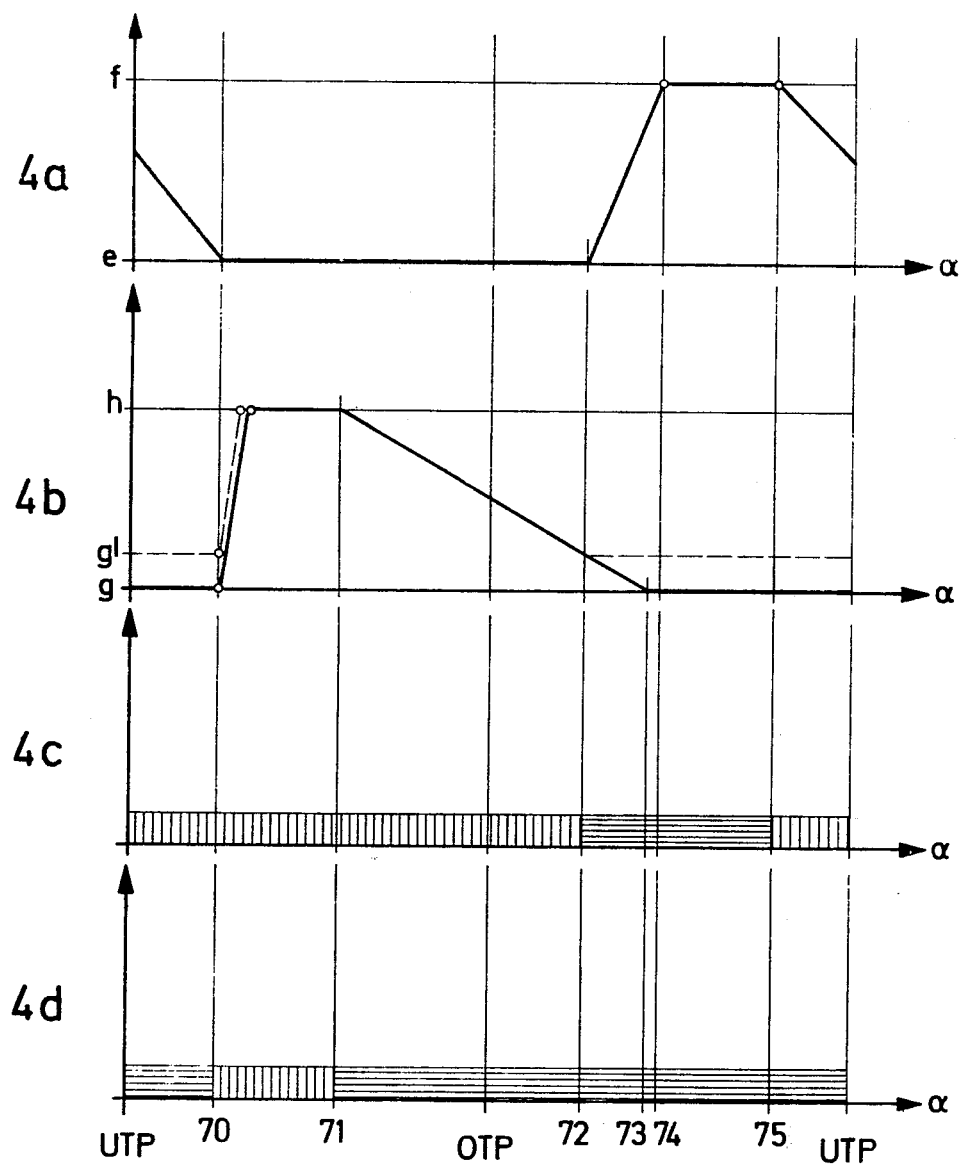
FIGS. 4a to 4d illustrate different control diagrams for the stroke and the amount of fuel admitted to the fuel plunger, and the control slider as a function of time or crank angle, or of the position of the piston determined thereby.

FIG. 4a illustrates the positions $f$ and $e$ of the control slider 18 where starting from the base line the displacement position is arbitrarily associated with the filling position $f$ and the base position with the working or injection position $e$. FIG. 4b illustrates the positions $g$ (base position) and $h$ (displacement position) as well as the travel of the fuel plunger 16 between these positions, while FIG. 4c illustrates the pressure conditions in the chamber 58 of the slider 18 associated with these positions and distances below the control slider 18. FIG 4d shows the pressure conditions in the chamber 36 for the plunger 16. In both presentations, admission of pressure is indicated vertically shaded and a condition without pressure horizontally shaded.

Referring to FIGS. 4a and 4b, the cyclic synchronized movements of the plunger 16, which doses and injects the fuel, and the control slider 18 are as follows.

At the lower dead center UTP of the piston 4, the plunger 16 is in the withdrawn position and rests against the stop 22. At this time, the plunger 16 occupies a rest position $g$ (FIG. 4b). The pressure chamber 36 (FIG. 4b) is without pressure, i.e. the rotary slider 27 separates the lines 32 and 40 from each other while, at the same time, the slot 38 of the slider 29 keeps the line 32 connected with the discharge line 41 via the throttle 45. Conversely, the slot 35 of the slider 28 connects the lines 33 and 40 to each other; at the same time, the lines 33 and 41 are, of course, separated from each other.

At this time, the control slider 18 (FIG. 4a), if pressure is admitted to the pressure chamber 58 (FIG. 4c) is moved against the action of the spring 54 between the filling position $f$ assumed at the top in FIG. 4a and the working or injection position $e$. At this time, the slider 57 shuts off the lines 62 and 66 while the lines 61 and 66 are in connection with each other via the slot 59 of the slider 56; the space 19a in the feeding duct 19 having been filled with fuel.

At the time 70, which corresponds approximately to the positions of the piston 4 and the plunger 16 shown in FIGS. 1 and 2, and of the slider 18, the pressure phase (FIG. 4b) begins in the chamber 36. As soon as the control slider 18 has reached the working position $e$, the plunger 16 executes a stroke from the rest position $g$ toward $h$, during which the plunger 16 traverses the entire duct 19 and ejects the amount of fuel located in the duct section 19a into the combustion chamber 7. In the diagram 4b, a stroke $g$ to $h$ of the plunger 16 is shown, on the one hand, for maximum power, which is given by the power-dependent extreme position of the stop 22; on the other hand, a stroke $g'$ to $h$ is indicated by dashed lines, which correspond to minimum fuel consumption for minimum power and is executed at the other extreme position of the stop 22.

The displacement of the plunger 16 into the position $h$ (FIG. 4b) and therefore the pressure phase in the chamber 36 are terminated at the time 71 (FIG. 4b). The pressure medium now flows from the chamber 36 via a flow connection 32, 44, 38 and 41, delayed by the throttle 45. At the same time, pressure builds up via a path 40, 35, 33 in the chamber 37 on the other side of the servo piston 31 for the plunger 16. As a result, the plunger 16 moves back into the rest position $g$ or $g'$, respectively, which is reached at the time 73 or 72, respectively.

Let us assume that in this movement the plunger has returned at a time 72 between 71 and 73 far enough that by leaving the opening 17 a displacement of the control slider 18 is no longer impeded. At the time 72, the pressure phase in the chamber 58 (FIG. 4c) is therefore terminated by the appropriate position of the sliders 56 and 57 and the control slider 18 begins to move from $e$ to $f$ (FIG. 4a) under the action of the spring 54, reaching the position $f$ at the time 74. In this position, the semicircular passage 46 of the slider 18 connects the duct 47 with the section 19a of the duct 19 whereby the pressure chamber 49 is relieved to some degree. Through this relief, the piston 53 driven by the spring 52 transports the amount of fuel required for the next cycle into the feed duct 19a whereupon the dosing and ejection means 15 is ready again for the next ejection operation.

The filling process is completed at the time 75 from which time on pressure again builds up in the chamber 58 and the control slider 18 therefore returns to the working position $e$, the cycle being closed when the time 70 is reached.

In conclusion, the correlation of the times indicated in FIGS. 4a to 4d and the position of the working piston 4 will be sketched briefly. Starting from the lower dead center UTP of the piston 4, the injection of the fuel into the combustion chamber 7, or the pocket 8 of the piston 4, takes place in the first half of a compression stroke. Transferred to FIG. 4, this means that the pressure phase 70 to 71 for the fuel plunger 16 must lie, as shown, in the first half of the time interval UTP to OTP, which represents the compression stroke of the piston. In the time interval 71 to OTP, the escape of the fuel from the pocket as well as the ignition and combustion of the fuel takes place.

The times 72, 73, 74 and 75 are not directly connected with the travel and the position of the working piston 4 and can therefore be freely chosen within certain limits according to other requirements.

During operation, the fuel jet 14 ejected by the ejecting means 15 initially collects under the undercut 13 during a first half of the compression stroke of the piston 4 and is then released into the combustion chamber 7 during a second half of the compression stroke under the influence of a decreasing centrifugal force and an increasing axial deceleration of the piston 4. In addition, during the first half of the compression stroke, the piston 4 closes off the inlet bores 11.

What is claimed is:
1. In a reciprocating internal combustion engine the combination comprising at least one cylinder having a wall defining a combustion chamber;

a piston slidably mounted in said cylinder to move into said combustion chamber during a compression stroke, said piston having a centrally disposed pocket in a surface thereof facing said combustion chamber, said pocket having an undercut portion in a peripheral surface thereof; and a mechanical fuel dosing and ejecting means mounted on said cylinder wall for ejecting powdered fuel cyclically and tangentially into said pocket for initial collection under said undercut during a first half of said compression stroke and for release into said combustion chamber during a second half of said compression stroke under the influence of decreasing centrifugal force and increasing axial deceleration of said piston.

2. The combination as set forth in claim 1 which further comprises an ignition means for initiating combustion of the fuel in said combustion chamber.

3. The combination as set forth in claim 1 which further comprises a cylinder head opposite said piston and an air injection means centrally disposed in said cylinder head for blowing air into said pocket.

4. The combination as set forth in claim 1 wherein said pocket has a conical surface bounding said undercut for guiding the fuel from said pocket into said combustion chamber.

5. The combination as set forth in claim 1 which further comprises at least one bore in said cylinder wall for admitting air into said combustion chamber, and a control means connected to said fuel dosing and ejecting means for activating said latter means to eject fuel into said pocket when said piston covers said bore at least partially during said compression stroke.

6. The combination as set forth in claim 1 wherein said first dosing and ejecting means includes a fuel receiving duct, a plunger in said duct and pressure means for moving said plunger through said duct to eject the fuel therein into said piston pocket.

7. The combination as set forth in claim 6 wherein said pressure means has a double action control on said plunger.

8. The combination as set forth in claim 7 wherein said control means includes a throttle for asymmetric movement of said plunger whereby said plunger moves faster when moving towards said combustion chamber and slower when moving from said combustion chamber.

9. The combination as set forth in claim 6 wherein said plunger is adjustably mounted in said duct for adjusting the amount of fuel to be ejected.

10. The combination as set forth in claim 6 which further comprises a fuel accumulator for receiving fuel and a control slider in said fuel receiving duct, said slider being movable between a first position blocking said plunger while connecting said duct to said accumulator and a second position blocking said accumulator while permitting movement of said plunger in said duct.

11. The combination as set forth in claim 10 wherein said plunger passes through said slider when said slider is in said second position.

12. The combination as set forth in claim 10 which further comprises a fuel feeding means for continuously supplying fuel to said accumulator.

13. The combination as set forth in claim 10 wherein said fuel feeding means includes a fuel transporting duct having an increasing flow cross-section in the direction of said accumulator and said accumulator has a fuel passage connected to said fuel tansporting duct and having an increasing flow cross-section in the direction away from said fuel transporting duct.

14. The combination as set forth in claim 10 wherein said slider and said plunger are movable in synchronized relation.

* * * * *

UNITED STATES PATENT OFFICE
CERTIFICATE OF CORRECTION

Patent No. 4,056,080            Dated November 1, 1977

Inventor(s) Peter Rutz et al.

It is certified that error appears in the above-identified patent and that said Letters Patent are hereby corrected as shown below:

Column 3, line 31, "The position" should read -- The piston --.
Column 5, line 38, "4b" should read -- 4d --.
Column 8, line 32, "tansporting" should read -- transporting --.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks